United States Patent
De La Torre-Bueno et al.

(10) Patent No.: US 8,582,924 B2
(45) Date of Patent: Nov. 12, 2013

(54) DATA STRUCTURE OF AN IMAGE STORAGE AND RETRIEVAL SYSTEM

(75) Inventors: Jose De La Torre-Bueno, Carlsbad, CA (US); Cynthia B. Perz, Huntington Beach, CA (US)

(73) Assignee: Carl Zeiss MicroImaging GmbH, Jena (DE)

( * ) Notice: Subject to any disclaimer, the term of this patent is extended or adjusted under 35 U.S.C. 154(b) by 2227 days.

(21) Appl. No.: 10/882,661

(22) Filed: Jun. 30, 2004

(65) Prior Publication Data
US 2006/0002636 A1    Jan. 5, 2006

(51) Int. Cl.
*G06K 9/60*    (2006.01)

(52) U.S. Cl.
USPC ............. 382/305; 356/39; 370/477; 382/133; 382/134; 382/239

(58) Field of Classification Search
USPC .......................... 382/305, 133–134, 128–129
See application file for complete search history.

(56) References Cited

U.S. PATENT DOCUMENTS

| | | | |
|---|---|---|---|
| 3,824,393 A | 7/1974 | Brain | |
| 3,851,972 A | 12/1974 | Smith et al. | |
| 4,011,004 A | 3/1977 | Levine et al. | |
| 4,097,845 A * | 6/1978 | Bacus ........................... | 382/134 |
| 4,125,828 A | 11/1978 | Resnick et al. | |
| 4,196,265 A | 4/1980 | Koprowski et al. | |
| 4,210,419 A | 7/1980 | Castleman | |
| 4,249,825 A | 2/1981 | Shapiro | |
| 4,338,024 A | 7/1982 | Bolz et al. | |
| 4,342,905 A | 8/1982 | Fujii et al. | |
| 4,349,528 A | 9/1982 | Koprowski et al. | |
| 4,364,932 A | 12/1982 | Kung et al. | |
| 4,364,933 A | 12/1982 | Kung et al. | |
| 4,364,934 A | 12/1982 | Kung et al. | |
| 4,364,935 A | 12/1982 | Kung et al. | |
| 4,364,936 A | 12/1982 | Kung et al. | |
| 4,364,937 A | 12/1982 | Kung et al. | |
| 4,393,466 A | 7/1983 | Deindoerfer et al. | |
| 4,513,438 A | 4/1985 | Graham et al. | |
| 4,612,614 A | 9/1986 | Deindoerfer et al. | |

(Continued)

FOREIGN PATENT DOCUMENTS

| | | |
|---|---|---|
| DE | 3340647 | 5/1985 |
| DE | 3735091 | 4/1988 |

(Continued)

OTHER PUBLICATIONS

Arklie, et al., "Differentiation Antigens Expressed by Epithelial Cells in the Lactating Breast are also Detectable in Breast Cancers", *Int. J. Cancer*, vol. 28, pp. 23-29, 1981.

(Continued)

*Primary Examiner* — Tsung-Yin Tsai
(74) *Attorney, Agent, or Firm* — Patterson Thuente Pedersen, P.A.

(57) ABSTRACT

Disclosed is an imaging system that stores and retrieves very large scanned digital images, as in applications that automatically scan biological samples using a computer-controlled digital camera microscope. Slide data is entered, zelle data is captured and compressed and a zelle database file is loaded. Furthermore, an image database file is loaded and it is determined whether another zelle is to be stored. The image can be retrieved by accessing the zelle database, reading a zelle record, reading an image file, loading the display buffer, and determining whether another zelle is to be loaded.

25 Claims, 8 Drawing Sheets

(56) References Cited

U.S. PATENT DOCUMENTS

| | | | |
|---|---|---|---|
| 4,656,594 A | 4/1987 | Ledley | |
| 4,673,973 A | 6/1987 | Ledley | |
| 4,700,298 A | 10/1987 | Palcic et al. | |
| 4,741,043 A | 4/1988 | Bacus | |
| 4,761,075 A * | 8/1988 | Matsushita et al. | 356/39 |
| 4,939,240 A | 7/1990 | Chu et al. | |
| 4,945,220 A | 7/1990 | Mallory et al. | |
| 4,965,725 A | 10/1990 | Rutenberg | |
| 4,991,223 A | 2/1991 | Bradley | |
| 5,003,165 A | 3/1991 | Sarfati et al. | |
| 5,008,185 A | 4/1991 | Bacus | |
| 5,016,173 A | 5/1991 | Kenet et al. | |
| 5,018,209 A | 5/1991 | Bacus | |
| 5,051,816 A | 9/1991 | Harrison et al. | |
| 5,068,909 A | 11/1991 | Rutherford et al. | |
| 5,085,325 A | 2/1992 | Jones et al. | |
| 5,087,965 A | 2/1992 | Torre-Bueno | |
| 5,123,055 A | 6/1992 | Kasdan | |
| 5,202,931 A | 4/1993 | Bacus | |
| 5,231,580 A | 7/1993 | Cheung et al. | |
| 5,233,684 A | 8/1993 | Ulichney | |
| 5,235,522 A | 8/1993 | Bacus | |
| 5,254,845 A | 10/1993 | Burgess et al. | |
| 5,257,182 A | 10/1993 | Luck et al. | |
| 5,268,966 A | 12/1993 | Kasdan | |
| 5,287,272 A | 2/1994 | Rutenberg et al. | |
| 5,317,140 A | 5/1994 | Dunthorn | |
| 5,321,545 A | 6/1994 | Bisconte | |
| 5,323,207 A | 6/1994 | Ina | |
| 5,338,924 A | 8/1994 | Barrett et al. | |
| 5,352,613 A | 10/1994 | Tafas et al. | |
| 5,375,177 A | 12/1994 | Vaidyanathan et al. | |
| 5,409,007 A | 4/1995 | Saunders et al. | |
| 5,422,018 A | 6/1995 | Saunders et al. | |
| 5,428,690 A | 6/1995 | Bacus et al. | |
| 5,432,054 A | 7/1995 | Saunders et al. | |
| 5,432,871 A | 7/1995 | Novik | |
| 5,449,622 A | 9/1995 | Yabe et al. | |
| 5,459,384 A | 10/1995 | Engelse et al. | |
| 5,463,470 A | 10/1995 | Terashita et al. | |
| 5,463,702 A * | 10/1995 | Trueblood | 382/239 |
| 5,469,353 A | 11/1995 | Pinsky et al. | |
| 5,473,706 A | 12/1995 | Bacus et al. | |
| 5,481,401 A | 1/1996 | Kita et al. | |
| 5,489,386 A | 2/1996 | Saunders | |
| 5,499,097 A | 3/1996 | Ortyn et al. | |
| 5,515,172 A | 5/1996 | Shiau | |
| 5,526,258 A | 6/1996 | Bacus | |
| 5,533,628 A | 7/1996 | Tao | |
| 5,544,650 A | 8/1996 | Boon et al. | |
| 5,546,323 A | 8/1996 | Bacus et al. | |
| 5,583,666 A | 12/1996 | Ellson et al. | |
| 5,585,469 A | 12/1996 | Kojima et al. | |
| 5,586,160 A | 12/1996 | Mascio | |
| 5,602,941 A | 2/1997 | Charles et al. | |
| 5,610,022 A | 3/1997 | Battifora | |
| 5,619,032 A | 4/1997 | Kasdan | |
| 5,625,705 A | 4/1997 | Recht | |
| 5,625,709 A | 4/1997 | Kasdan | |
| 5,635,402 A | 6/1997 | Alfano et al. | |
| 5,646,677 A | 7/1997 | Reber | |
| 5,647,025 A | 7/1997 | Frost et al. | |
| 5,671,288 A | 9/1997 | Wilhelm et al. | |
| 5,690,892 A | 11/1997 | Babler et al. | |
| 5,691,779 A | 11/1997 | Yamashita et al. | |
| 5,701,172 A | 12/1997 | Azzazy | |
| 5,706,093 A | 1/1998 | Komiya | |
| 5,726,009 A | 3/1998 | Connors et al. | |
| 5,731,156 A | 3/1998 | Golbus | |
| 5,735,387 A | 4/1998 | Polaniec et al. | |
| 5,740,267 A | 4/1998 | Echerer et al. | |
| 5,740,270 A | 4/1998 | Rutenberg et al. | |
| 5,773,459 A | 6/1998 | Tang et al. | |
| 5,783,814 A | 7/1998 | Fairley et al. | |
| 5,795,723 A | 8/1998 | Tapscott et al. | |
| 5,799,105 A | 8/1998 | Tao | |
| 5,846,749 A | 12/1998 | Slamon et al. | |
| 5,851,186 A | 12/1998 | Wood et al. | |
| 5,854,851 A | 12/1998 | Bamberger et al. | |
| 5,867,598 A | 2/1999 | De Queiroz | |
| 5,877,161 A | 3/1999 | Riabowol | |
| 5,880,473 A | 3/1999 | Ginestet | |
| 5,888,742 A | 3/1999 | Lal et al. | |
| 5,889,881 A | 3/1999 | MacAulay et al. | |
| 5,911,003 A | 6/1999 | Sones | |
| 5,911,327 A | 6/1999 | Tanaka et al. | |
| 5,962,234 A | 10/1999 | Golbus | |
| 5,966,309 A | 10/1999 | O'Bryan et al. | |
| 5,966,465 A | 10/1999 | Keith et al. | |
| 6,006,191 A | 12/1999 | DiRienzo | |
| 6,007,996 A | 12/1999 | McNamara et al. | |
| 6,011,595 A | 1/2000 | Henderson et al. | |
| 6,031,929 A | 2/2000 | Maitz et al. | |
| 6,040,139 A | 3/2000 | Bova | |
| 6,058,322 A | 5/2000 | Nishikawa et al. | |
| 6,069,242 A | 5/2000 | Zavada et al. | |
| 6,072,570 A | 6/2000 | Chipman et al. | |
| 6,087,134 A | 7/2000 | Saunders | |
| 6,097,838 A | 8/2000 | Klassen et al. | |
| 6,101,265 A | 8/2000 | Bacus et al. | |
| 6,117,985 A | 9/2000 | Thomas et al. | |
| 6,122,400 A | 9/2000 | Reitmeier | |
| 6,125,194 A | 9/2000 | Yeh et al. | |
| 6,141,602 A | 10/2000 | Igarashi et al. | |
| 6,151,535 A | 11/2000 | Ehlers | |
| 6,160,618 A | 12/2000 | Garner | |
| 6,169,816 B1 | 1/2001 | Ravkin | |
| 6,203,987 B1 | 3/2001 | Friend et al. | |
| 6,215,892 B1 | 4/2001 | Douglass et al. | |
| 6,215,894 B1 | 4/2001 | Zeleny et al. | |
| 6,225,636 B1 | 5/2001 | Ginestet | |
| 6,226,392 B1 | 5/2001 | Bacus et al. | |
| 6,226,636 B1 | 5/2001 | Mottaleb et al. | |
| 6,236,031 B1 | 5/2001 | Ueda | |
| 6,238,892 B1 | 5/2001 | Mercken et al. | |
| 6,255,465 B1 | 7/2001 | Ferguson-Smith et al. | |
| 6,259,807 B1 | 7/2001 | Ravkin | |
| 6,270,971 B1 | 8/2001 | Ferguson-Smith et al. | |
| 6,281,874 B1 | 8/2001 | Sivan et al. | |
| 6,290,907 B1 | 9/2001 | Takahashi et al. | |
| 6,313,452 B1 | 11/2001 | Paragano et al. | |
| 6,351,712 B1 | 2/2002 | Stoughton et al. | |
| 6,352,861 B1 | 3/2002 | Copeland et al. | |
| 6,374,989 B1 | 4/2002 | van Dyke, Jr. et al. | |
| 6,379,929 B1 | 4/2002 | Burns et al. | |
| 6,418,236 B1 | 7/2002 | Ellis et al. | |
| 6,466,690 B2 | 10/2002 | Bacus et al. | |
| 6,468,476 B1 | 10/2002 | Friend et al. | |
| 6,518,554 B1 | 2/2003 | Zhang | |
| 6,553,135 B1 | 4/2003 | Ring et al. | |
| 6,631,203 B2 | 10/2003 | Ellis et al. | |
| 6,671,393 B2 | 12/2003 | Hays et al. | |
| 6,674,896 B1 | 1/2004 | Torre-Bueno | |
| 6,697,509 B2 | 2/2004 | Torre-Bueno | |
| 6,718,053 B1 | 4/2004 | Ellis et al. | |
| 2002/0034762 A1 | 3/2002 | Muller et al. | |
| 2002/0067409 A1 | 6/2002 | Harari et al. | |
| 2002/0106119 A1 * | 8/2002 | Foran et al. | 382/133 |
| 2002/0164810 A1 | 11/2002 | Dukor et al. | |
| 2003/0043852 A1 * | 3/2003 | Tadayon et al. | 370/477 |
| 2003/0124589 A1 | 7/2003 | Piper | |
| 2003/0138140 A1 | 7/2003 | Marcelpoil et al. | |
| 2003/0170703 A1 | 9/2003 | Piper et al. | |
| 2006/0002636 A1 * | 1/2006 | Torre-Bueno et al. | 382/305 |

FOREIGN PATENT DOCUMENTS

| | | |
|---|---|---|
| EP | 0213666 | 3/1987 |
| EP | 0557871 | 9/1993 |
| EP | 0713086 | 5/1996 |
| WO | WO 92/17848 | 10/1992 |
| WO | WO 97/20198 | 6/1997 |
| WO | WO 00/49391 | 8/2000 |
| WO | WO 01/25476 | 4/2001 |

(56) References Cited

FOREIGN PATENT DOCUMENTS

| WO | WO 01/37206 | 5/2001 |
|---|---|---|
| WO | WO 03/003057 | 1/2003 |
| WO | WO 03/014795 | 2/2003 |
| WO | WO 03/040064 | 5/2003 |

OTHER PUBLICATIONS

Atassi, "Precise Determination of Protein Antigenic Structures has Unravelled the Molecular Immune Recognition of Proteins and Provided a Prototype for Synthetic Mimicking of Other Protein Binding Sites", *Molecular & Cellular Biochemistry*, vol. 32, pp. 21-43, 1980.
Aziz, "Quantitation of Estrogen and Progesterone Receptors by Immunocytochemical and Image Analyses", *American Journal of Clinical Pathology*, vol. 98, No. 1, pp. 105-111, Jul. 1992.
Bacus, et al., "The Evaluation of Estrogen Receptor in Primary Breast Carcinoma by Computer-Assisted Image Analysis", *American Journal of Clinical Pathology*, vol. 90, No. 2, pp. 233-239, Aug. 1988.
Baddoura, et al., "Image Analysis for Quantitation of Estrogen Receptor in Formalin-Fixed Paraffin-Embedded Sections of Breast Carcinoma", *Modern Pathology*, vol. 4, No. 1, pp. 91-95, 1991.
Baer, et al., "Stochastic Models of Local Structures Versus Global Atomic Configurations", *Journal of Non-Crystalline Solids*, vols. 192 and 193, pp. 106-110, 1995.
Ballard, et al., *Computer Vision*, Prentice-Hall, Inc., Englewood Cliffs, New Jersey, USA, pp. 65-70; pp. 149-165, 1982.
Bander, "Monoclonal Antibodies to Renal Cancer Antigens", *European Urology*, vol. 18, No. 2, pp. 10-12, Aug. 1990.
Baxes, *Digital Image Processing Principles and Applications*, John Wiley & Sons, Inc., pp. 127-137.
Castleman, *Digital Image Processing*, Prentice Hall, Upper Saddle River, New Jersey, pp. 452-460; 551-554, 1996.
Caulet, et al., "Comparative Quantitative Study of Ki-67 Antibody Staining in 78B and T Cell Malignant Lymphoma (ML) Using Two Image Analyser Systems", *Path. Res. Pract.*, vol. 188, pp. 490-496, 1992.
Ceriani, et al., "Circulating human mammary epithelial antigens in breast cancer", *Proc. Natl. Acad. Sci.*, vol. 79, pp. 5420-5424, Sep. 1998.
Ceriani, et al., "Surface differentiation antigens of human mammary epithelial cells carried on the human milk fat globule", *Proc. Natl. Acad, Sci.*, vol. 74, No. 2, pp. 582-586, Feb. 1977.
ChromaVision, "Products", http://www/chromavision.com/products/index.htrn.
Ciocca, et al., "Immunohistochemical Detection of an Estrogen-regulated Protein by Monoclonal Antibodies", *Cancer Research*, vol. 42, pp. 4256-4258, Oct. 1982.
Colcher, et al., "A spectrum of monoclonal antibodies reactive with human mammary tumor cells",*Proc. Natl. Acad. Sci.*, vol. 78, No. 5,pp. 3199-3203, May 1981.
Cote, et al., "Prediction of Early Relapse in Patients with Operable Breast Cancer by Detection of Occult Bone Marrow Micrometastases", *Journal of Clinical Oncology*, vol. 9, No. 10, pp. 1749-1756, Oct. 1991.
Cuttitta, et al., "Monoclonal antibodies that demonstrate specificity for several types of human lung cancer", *Proc. Natl. Acad. Sci.*, vol. 78, No. 7, pp. 4591-4595, Jul. 1981.
Diamond, et al., "Computerized Image Analysis of Nuclear Shape as a Prognostic Factor for Prostatic Cancer", *The Prostate*, vol. 3, pp. 321-332, 1982.
Diel, et al., "Monoclonal Antibodies to detect breast cancer cells in bone marrow", Accession No. 94266290, *Important Advances in Oncology*, pp. 143-164, 1994, Abstract.
Dippold, et al., "Cell surface antigens of human malignant melanoma: Definition of six antigenic systems with mouse monoclonal antibodies", *Proc. Natl. Acad. Sci.*, vol. 77, No. 10, pp. 6114-6118, Oct. 1980.
Drobnjak, et al., "Immunocytochemical Detection of Estrogen and Progesterone Receptors (ER/PR) in Paraffin Sections of Human Breast Carcinoma, Correlation with Biochemical Analysis and Automated Imaging Quantitation", Laboratory Investigation, *a Journal of the United States and Canadian Academy of Pathology. Inc.*, Annual Meeting, Chicago, Illinois, Mar. 17-22, 1991.
Duda, et al., *Pattern Classification and Scene Analysis*, John Wiley & Sons, pp. 228-239; 276-284, 1973.
Enestrom, et al., "Quantitative Ultrastructural Immunocytochemistry Using a Computerized Image Analysis System", *Stain Technology*, vol. 65, No. 6, pp. 263-278, 1990.
Esteban, et al., "Quantification of Estrogen Receptors on Paraffin-Embedded Tumors by Image Analysis", *Modern Pathology*, vol. 4, No. 1, pp. 53-57, Jan. 1991.
Foster, et al., "Monoclonal Antibodies to the Human Mammary Gland", *Virchows Arch (Pathol. Anat.)*, vol. 394, pp. 279-293, 1982.
Freedman, et al., "B-Cell Monoclonal Antibodies and Their Use in Clinical Oncology", Accession No. 91191374, *Cancer Investigation*, vol. 9, No. 1, pp. 69-84, 1991, Abstract.
Goldschmidt, et al., "Automated Immunohistochemical Estrogen Receptor Staining and Computerized Image Analysis-Comparison with Biochemical Methods".
Gong, et al., "Prostate-specific membrane antigen (PSMA)-specific monoclonal antibodies in the treatment of prostate and other cancers", Accession No. 2000312481, *Cancer and Metastasis Reviews*, vol. 18, No. 4, pp. 483-490, 1999, Abstract.
Greene, "Monoclonal Antibodies to human estrogen receptor", *Proc. Natl. Acad. Sci.*, vol. 77, No. 9, pp. 5115-5119, Sep. 1980.
Gross, et al., "Quantitative Immunocytochemistry of Hypothalamic and Pituitary Hormones", *The Journal of Histochemistry and Cythochemistry*, vol. 33, No. 1, pp. 11-20, 1985.
Hartelius K., et al. "Bayesian Grid Matching" Institute of Mathematical Modeling Technical University of Denmark (Nov. 22, 2000).
Herlyn, M., et al., "Colorectal carcinoma-specific antigen: Detection by means of monoclonal antibodies," *Proc. Natl. Acad. Sci.*, U.S.A., vol. 76, pp. 1438-1442, 1979.
Horsfall, D.J. et al., "Immunocytochemical assay for oestrogen receptor in fine needle aspirates of breast cancer by video image analysis", *Br. J. Cancer*, 59, 129-134, 1989.
Janeway, C.A., et al., "Immunobiology," The Immune System in Health and Disease *Current Biology Ltd.*, Garland Publishing Inc., pp. 2:3-2:5, 1994.
Kerns, B.J. et al., "Estrogen receptor status evaluated in formalin-fixed paraffin embedded breast carcinomas determined by automated immunohistochemistry and image analysis", *Proceedings of the American Association for Cancer Research*, vol. 35, Mar. 1994.
Kohler, C. et al., "Continuous cultures of fused cells secreting antibody of predefined specificity,"*Nature*, vol. 256, pp. 495-497, 1975.
Kohler, C., et al., "Derivation of specific antibody-producing tissue culture and tumor lines by cell fusion," Eur. J. Immunol., vol. 6, pp. 511-519, 1976.
Lastoria, S. et al., "Management of patients with ovarian cancer using monoclonal antibodies", Accession No. 93313141, *Biomedicine and Pharmacotherapy*, Vol, 46, No. 10, pp. 453-63, 1992, Abstract.
Ledley, R.S. et al., "Fundamentals of True-Color Image Processing", *IEEE*, pp. 791-795, 1990.
Levine, Gary M. et al., "Quantitative Immunocytochemistry by Digital Image Analysis: Application to Toxicologic Pathology", *XICOLOGIC Pathology* ISSN:0192-6233, vol. 15, No. 3, pp. 303-307, 1987.
Lin, C.W. et al., Detection of exfoliated bladder cancer cells by monoclonal antibodies to tumor-associated cell surface antigens, Accession No. 91162409, *Journal of Occupational Medicine*, vol.32, No. 9, pp. 910-16, Sep. 1990. Abstract.
Mansi, J.L., et al., "Bone Marrow Micrometastases in Primary Breast Cancer: Prognostic Significance After 6 Years' Follow-Up," *Eur. J. Cancer*, vol. 27, No. 12, pp. 1552-1555, 1991.
Martin, V. M., et al., "Immunomagnetic enrichment of disseminated epithelial tumor cells from peripheral blood by MACS," *Experimental Hematology*, vol. 26, pp. 252-264.(1998).
Maudelonde, T. et al., "Immunostaining of Cathepsin D in Breast Cancer: Quantification by Computerised Image Analysis and Correlation with Cytosolic Assay", *Eur. J. Cancer*, vol. 28A, No.10, pp. 1686-1691, 1992.

(56) References Cited

OTHER PUBLICATIONS

McClelland, Richard A. et al., "Automated Quantitation of Immunocytochemically Localized Estrogen Receptors in Human Breast Cancer", Cancer Research 50, 3545-3550, Jun. 1990.

McClelland, Richard A., et al., "A Multicentre Study into the Reliability of Steroid Receptor Immunocytochemical Assay Quantification", *The European Journal of Cancer*, vol. 27, No. 6, pp. 711-715, Jun. 1991.

McGee, J O'D. et al., "A new marker for human cancer cells. 2. Immunohistochemical detection of the Ca antigen in human tissues with the Ca1 antibody," *The Lancet*, vol. 2, pp. 7-11, Jul. 3, 1982.

McKeough et al., "A Low-Cost Automatic Translation and Autofocusing System for a Microscope", *Measurement Science and Technology*, IOP Publishing, Bristol, GB, vol. 6, No. 5, pp. 583-587, May 1995.

Mize, R. Ranney et al., "Quantitative immunocytochemistry using an image analyzer. I. Hardware evaluation, image processing, and data analysis", *Journal of Neuroscience Methods*, vol. 26, pp. 1-24, 1988.

Moss, T.J., et al., "Prognostic Value of Immunocytologic Detection of Bone Marrow Metastases in Neuroblastoma," *The New England Journal of Medicine*, vol. 324, No. 4, pp. 219-226, Jan. 1991.

Nadler, L.M. et al., "A monoclonal antibody defining a lymphoma-associated antigen in man," J. Immunol., vol. 125, No. 2, pp. 570-577, 1980.

Naume, B., et al., "Immunomagnetic techniques for the enrichment and detection of isolated breast carcinoma cells in bone marrow and peripheral blood," *J. of Hematotherapy*, vol. 6, pp. 103-114, 1997.

Neame, P.B. et al., "The use of monoclonal antibodies and immune markers in the diagnosis, prognosis, and therapy of acute leukemia", Accession No. 94184108, *Transfusion Medicine Reviews*, vol. 8, No. 1, pp. 59-75, Jan. 1994. Abstract.

Neville, A.M., "Detection of tumor antigens with monoclonal antibodies", Accession No. 92096159, *Current Opinion in Immunology*, vol. 3, No. 5, pp. 674-8, Oct. 1991. Abstract.

Nuti, M. et al.;"A monoclonal antibody (B72.3) defines patterns of distribution of a novel tumor-associated antigen in human mammary carcinoma cell populations", *Int. J. Cancer*, vol. 29, pp. 539-545, 1982.

Poynton, Frequently asked questions about color, www.inforamp.net/~poynton, pp. 1-24, Dec. 30, 1999.

Pratt, William K., *Digital Image Processing, 2nd Edition*, A Wiley-Interscience Publication, 1991.

Press, Michael F. et al., "Her-2/nue Expression in Node-negative Breast Cancer: Direct Tissue Quantitation by Computerized Image Analysis and Association of Overexpression with Increased Risk of Recurrent Disease"*Cancer Research*, vol. 53, pp. 4960-4970, Oct. 1993.

Price, J.O., et al., "Prenatal Diagnosis with Fetal Cells Isolated from Maternal Blood by Multiparameter Flow Cytometry," *Am. J. Obstet. Gynecol.*, vol. 165, pp. 1731-1737, Dec. 1991.

Price, M.R. et al., "Summary report on the ISOBM TD-4 Workshop: analysis of 56 monoclonal antibodies against the MUC1 mucin" Accession No. 1998084002, San Diego, CA, Nov. 17-23, 1996, *Tumour Biology*, vol. 19, Suppl. 1, pp. 1-20, 1998. Abstract.

Roca et al., "New Autofocusing Algorithm for Cytological Tissue in a Microscopy Environment", *Optical Engineering, Soc. of Photo-Optical Instrumentation Engineers*, Bellingham, US, vol. 37, No. 2, pp. 635-641, Feb. 1, 1998.

Russ, John C., *Image Processing Handbook, 2nd Edition*, Library of Congress Cataloging-in-Publication Data, 1995.

Scheinberg, D.A., "Monoclonal antibodies in the treatment of myelogenous leukemias", Accession No. 93199942, *Cancer Treat. and Res.*, vol. 64, pp. 213-32, 1993. Abstract.

Schultz, Daniel S., et al., "Comparison of Visual and CAS-200 Quantitation of Immunocytochemical Staining in Breast Carcinoma Samples", *Analytical and Quantitative Cytology and Histology*, vol. 14, No. 1, pp. 35-40, Feb. 1992.

Sell, S., "Cancer markers of the 1990s", Accession No. 90235478, *Clinics in Lab. Med.*, vol. 10, No. 1, pp. 1-37, Mar. 1990. Abstract.

Seregni, E. et al., "Mucinic tumor markers recognized by monoclonal antibodies", Accession No. 91217796, *J. Nuc. Med. and Allied Sci.*, vol. 34, No. 4, pp. 314-320, Oct.-Dec. 1990. Abstract.

Simpson, J.L. and Elias, S., "Isolating Fetal Cells From Maternal Blood—Advances in Prenatal Diagnosis Through Molecular Technology," *JAMA*, vol. 270, No. 19, pp. 2357-2361, Nov. 17, 1993.

Taylor-Papadimitriou, J. et al., "Monoclonal antibodies to epithelium-specific components of the human milk fat globule membrane: production and reaction with cells in culture," *Int. J. Cancer*, vol. 28, pp. 17-21, 1981.

Tyer, C.L., et al., "Breast cancer cells are effectively purged from peripheral blood progenitor cells with an immunomagnetic technique," *Clinical Cancer Research*, vol. 2, pp. 81-86, 1996.

Unnerstall, James R. et al., "New Approaches to Quantitative Neuropathology: Multtivariate Analysis of Morphologic and Neurochemical Measures", *Neurobiology of Aging*, vol. 8, pp. 567-569, Pergamon Journals Ltd., 1987.

Vaickus, L. et al., "Overview of monoclonal antibodies in the diagnosis and therapy of cancer", Accession No. 91322684, *Cancer Investigation*, vol. 9, No. 2, pp. 195-209, 1991. Abstract.

Vangsted, A.J., et al., "Monoclonal antibodies for diagnosis and potential therapy of small cell lung cancer—the ganglioside antigen fucosyl-GM1", Accession No. 94137489, *Acta Oncologica*, Vo. 32, No. 7-8, pp. 845-851, 1993, Abstract.

Wallace, The JPEG Still Picture Compression Standard, IEEE Transactions on Consumer Electronics, vol. 38, No. 1, pp. xviii-xxxiv, Feb. 1992.

Wikstrand, C.J. and Bigner, D.C., "Expression of human fetal brain antigens by human tumors of neuroectodermal origin as defined by monoclonal antibodies," *Cancer Res.*, vol. 42, No. 1, pp. 267-275, Jan. 1982.

\* cited by examiner

DATA STRUCTURE OF AN IMAGE STORAGE AND RETRIEVAL SYSTEM

TECHNICAL FIELD

The disclosure relates to storage and retrieval of large quantities of graphical data for computer image processing and display applications. In particular, the disclosure relates to a method of storing and retrieving digital images acquired by a computer-controlled digitizing microscope.

BACKGROUND

In the field of anatomic pathology, a piece of human tissue is typically inspected and analyzed by staining the tissue with a substance that reveals the presence of material of diagnostic significance. The stained tissue sample is then viewed on a slide under a microscope. Imaging systems exist that display an image and allow the user to view and draw the region that is of interest using graphics tools, and to subsequently collect and store the image.

A challenge relating to microscopy for anatomic pathology is data acquisition and storage using a scanning instrument, such as a digital camera in combination with a computer-controlled microscope. The microscope takes photographic images of a specimen in the microscopic field of view. Once the image is captured, a quantitative analysis by image-processing techniques is performed on tissue types having various architectural features. Typically, for each slide, 100 to 400 tissue images are collected at 40× magnification. Consequently, a digital representation of an entire microscope slide at high power requires considerable computer storage space.

The current standard for storing large quantities of scanned image data is to use a single large file of a standard graphical format. The common graphical file formats used are named according to the type of compression employed by the standard. There are several compression standards, common examples of which include JPEG, MPEG, GIF, TIFF, PICT, and ZIP. Currently no standard file formats allow for the lossless compression of images in a non-rectangular data structure. In addition, these formats provide no correlation of image data with real-world coordinates of the actual physical object that has been scanned, as would be useful in microscopy for anatomic pathology.

Therefore, it would be desirable to achieve improvements in image data compression techniques and improvements to image data storage architectures and methods are to fulfill the data storage requirements of organic and other amorphous structures and to reduce the data acquisition time associated with these high-power images.

SUMMARY

Disclosed is a method of storing a digital image acquired by a computer-controlled digitizing microscope. The method includes the partitioning a microscopic image into a group of zelles, wherein each zelle comprises a discrete portion of the microscopic image; capturing attribute data for each zelle, the attribute data being descriptive of an associated zelle and capturing image data descriptive of a discrete portion of the microscopic image contained in the associated zelle; compressing the image data for each zelle; storing the attribute data in a zelle database comprised of at least one zelle database file, each zelle database file being associated with at least one corresponding zelle; and storing the compressed image data in an image database comprised of at least one image file, wherein each image file is associated with a corresponding zelle database file.

In another aspect, there is disclosed a computer program on computer readable medium comprising instructions to cause a computer to partition a microscopic image into a group of zelles, wherein each zelle comprises a discrete portion of the microscopic image; for each zelle, capture attribute data descriptive of an associated zelle and capture image data descriptive of a discrete portion of the microscopic image contained in the associated zelle; compress the image data for each zelle; store the attribute data in a zelle database comprised of at least one zelle database file, each zelle database file being associated with at least one corresponding zelle; and store the compressed image data in an image database comprised of at least one image file, wherein each image file is associated with a corresponding zelle database file.

In another aspect, there is disclosed a microscope imaging system comprising a computer, which comprises a system processor and a computer program on computer readable medium. The computer program comprises instructions to cause the computer to partition a microscopic image into a group of zelles, wherein each zelle comprises a discrete portion of the microscopic image; for each zelle, capture attribute data descriptive of an associated zelle and capture image data descriptive of a discrete portion of the microscopic image contained in the associated zelle; compress the image data for each zelle; store the attribute data in a zelle database comprised of at least one zelle database file, each zelle database file being associated with at least one corresponding zelle; and store the compressed image data in an image database comprised of at least one image file, wherein each image file is associated with a corresponding zelle database file.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Disclosed is a system and method for storing and retrieving digital images acquired by a computer-controlled digitizing microscope. The disclosed systems and methods optimize the image data acquisition time and the image data storage structures associated with imaging a tissue specimen using an automated imaging system. Furthermore, the disclosed systems and methods are configured to efficiently handle a very large amount of scanned image data for a computer graphics system and minimize the computer memory resources required by large image files. As described below, a computer graphics database format structure is utilized that associates its constituent scanned image data files with real-world measurement coordinates that correlate to the physical position of the scanned object.

Figure 1A:
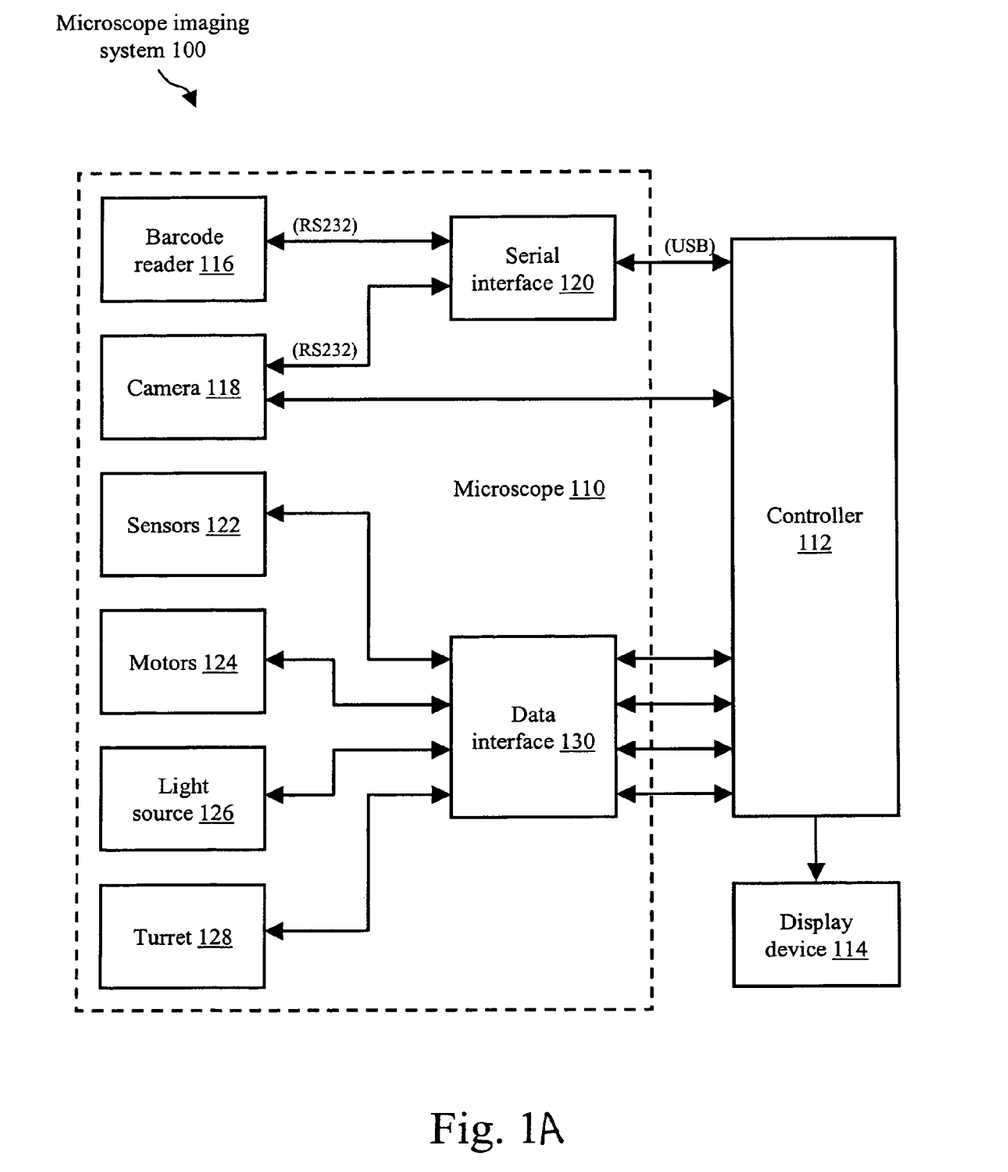
FIG. 1A illustrates a high-level functional diagram of a microscope imaging system.

FIG. 1A illustrates an exemplary high-level functional diagram of a microscope imaging system 100 configured in a manner that can be used to effect the disclosed systems and methods. The microscope imaging system 100 includes a microscope 110 electrically connected to a controller 112 having a display device 114. The controller 112 in FIG. 1A can be any special-purpose or conventional computer, such as a desktop, laptop, or host computer. The controller 112 is loaded with the appropriate software for controlling microscope imaging system 100, such as software for running image-processing algorithms and image analysis algorithms. The display device 114 can be any special-purpose or conventional computer display device that outputs graphical images to a user.

In an embodiment, the microscope 110 is a computer-controlled microscope suitable for use in an automated imaging system. In an embodiment, the microscope 110 is a ChromaVision Automated Cellular Imaging System (ACIS). The microscope 110 further includes a barcode reader 116, a camera 118, a serial interface 120, one or more sensors 122, one or more motors 124, a light source 126, a turret 128, and a data interface 130, each of which is described further below.

Figure 2:
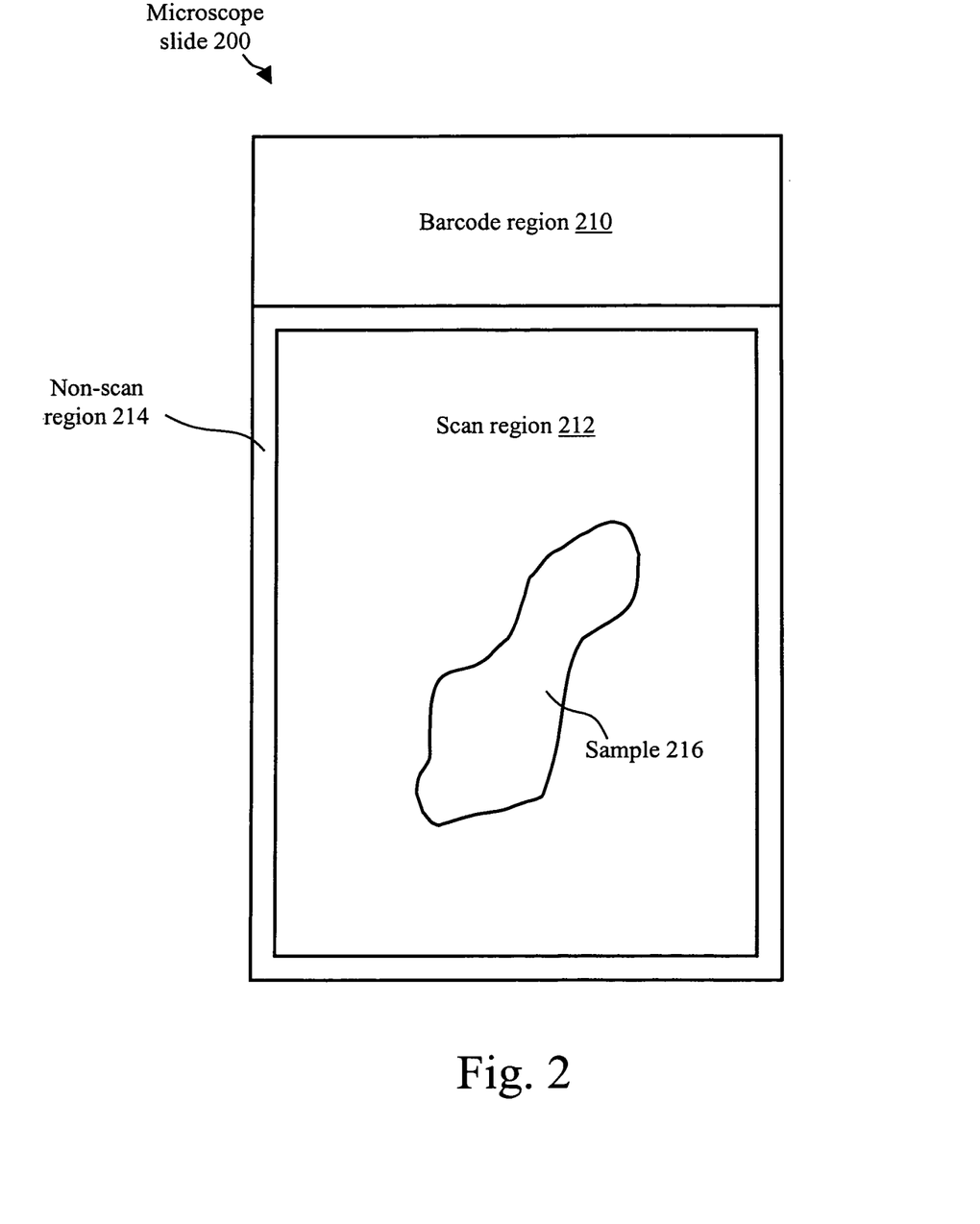
FIG. 2 illustrates a conventional microscope slide for use within the microscope imaging system.

The barcode reader 116 is a standard barcode reader capable of detecting an identifier located on, in the example of microscope imaging system 100, a standard microscope slide, as described in more detail in reference to FIG. 2. The barcode reader 116 can also comprise any type of device that can read and/or categorize an identifier located on the microscope slide.

The camera 118 can be a digital camera having selectable resolution capabilities. Furthermore, the camera can comprise any type of device suitable for gathering an image. The camera 118 is mounted upon a turret 128 of the microscope 110 such that an aperture of the camera 118 is aligned with the field of view (FOV) of any lens associated with the turret 128. The barcode reader 116 and the camera 118 are electrically coupled to a serial interface such that they can feed electrical inputs to a serial interface 120, which facilitates a serial communication link between the camera 118 and the barcode reader 116 and the controller 112. In an embodiment, the serial interface 120 provides a USB connection to controller 112. It should be appreciated that the camera 118 and the barcode reader 116 can be communicatively coupled to the controller 112 in other manners.

The controller 112 can include one or more components for facilitating its functions. In an embodiment, the controller includes a video card. The camera 118 provides a direct video output to the video card within the controller 112. The video card gathers the image data from camera 118 for processing in a well-known manner.

With reference still to FIG. 1A, the sensors can include one or more sensors for sensing various aspects of the imaging system 100. For example, the sensors 122 include, but are not limited to, position sensors, temperature sensors, and light intensity sensors or optical encoders. The motors 124 can be any type of motors for providing motion to the microscope or any portion of the microscope. In an embodiment, the motors 124 are conventional servomotors associated with the motion control of microscope 110, such as those for rotating the appropriately powered lens within the optical path of microscope 110, for adjusting focus, or for controlling an automated X,Y stage (shown in FIG. 1B).

The light source 126 can be any suitable light source for appropriately illuminating the FOV of microscope 110 sufficient to create a digital image of that FOV. The turret 128 is a conventional motor-driven microscope turret upon which is mounted a set of lenses of varying power that may be rotated into the optical path of the microscope 110. The turret 128 is also suitably controlled to provide the desired focus. The sensors 122, motors 124, light source 126, and turret 128 feed to the electrical inputs of the data interface 130. The data interface 130 can be a conventional system driver card, which facilitates a data communication link between these elements and a motion control card within the controller 112.

Figure 1B:
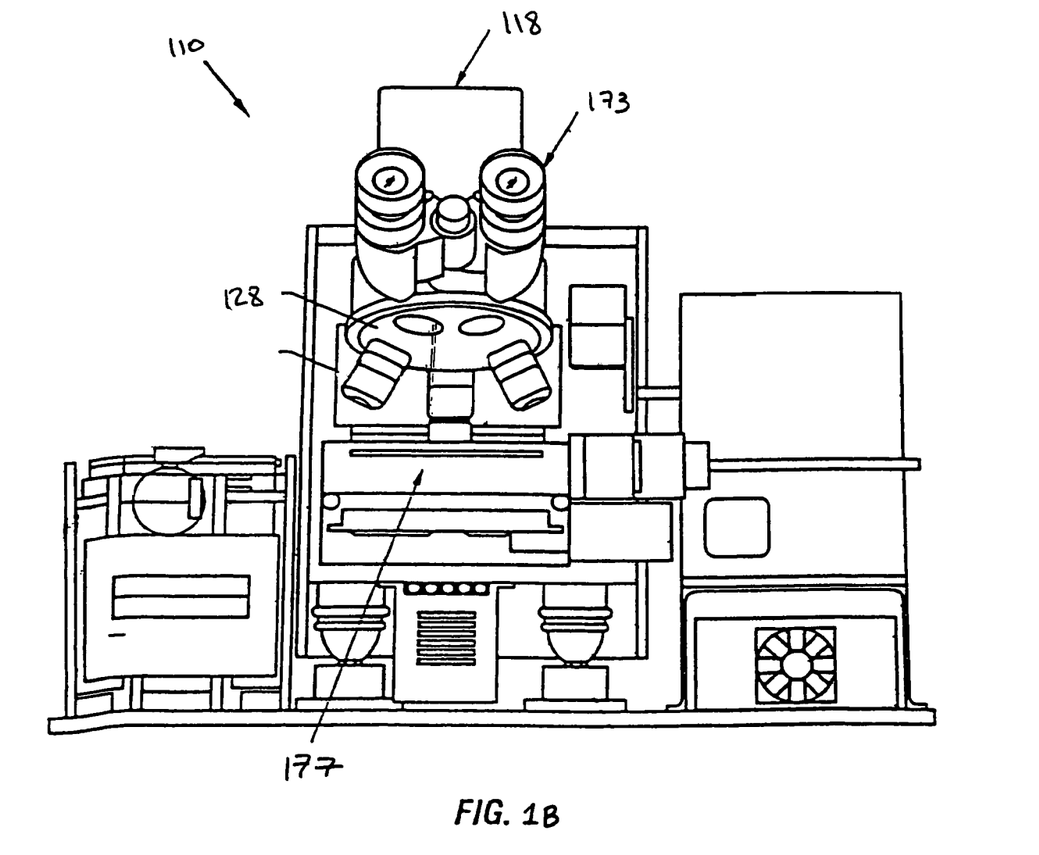
FIG. 1B illustrates a front view of an exemplary microscope.

FIG. 1B shows a front view of an exemplary microscope 110. A set of viewing oculars 173 of the microscope 110 are optionally located on the microscope 110 for operator viewing. As mentioned, the microscope 110 further includes a camera 118 for acquiring images. An automatic slide in-feed stage in conjunction with an X-Y stage 177 provide automatic slide handling in the apparatus. The illumination light source 126 in FIG. 1B) projects light onto the X-Y stage 177, which is subsequently imaged through the microscope 110 and acquired through the CCD camera 118 for processing in an image processor. A Z stage or focus stage 179 under control of the microscope controller 112 provides displacement in the Z plane for focusing. The microscope 110 further includes the motorized objective turret 128 for selection of objectives.

With reference now to FIGS. 1A and 1B, the generalized operation of microscope imaging system 100 is described. In an initial operation, one or more standard microscope slides having at least one biological sample deposited thereon and stained with one or more chromogenic dyes is fed to the automated X-Y stage 177 of the microscope 110. Each slide is fed via an in-feed stage and subsequently is positioned in the FOV of microscope 110. Additionally, as each slide transitions from the in-feed stage of the microscope imaging system 100 to the X,Y stage of the microscope 110, an identifier of the target microscope slide is read by barcode reader 116 or is identified in another manner.

Once the slide is positioned in the FOV of the microscope 110, an image scan operation is performed wherein the slide is scanned at a various resolutions and magnifications based upon image-processing algorithms and image analysis algorithms executed by the controller 112. Upon completion of the image scan operation, the slide is transferred out of microscope imaging system 100 via an out-feed stage of the system. Furthermore, the slide ID and image data for that particular slide is transmitted to controller 112 and stored in memory. The motion control system then moves the next target slide into the FOV of the microscope 110. The aforedescribed process automatically repeats for each microscope slide that is automatically fed into microscope imaging system 100.

It should be appreciated that the microscope imaging system 100 can be configured to operate autonomously. That is, a clinician can initiate the microscope imaging system 100 such that the microscope imaging system 100 thereafter operates automatically without the need for human intervention as long as a supply of microscope slides is available at its in-feed stage and no system errors occur. At any time during the process, however, a clinician may view and/or manipulate the digital image of any given slide via controller 112 and display device 114 for the inspection and analysis of any given specimen, as is well known in anatomic pathology. This is possible because the controller 112 reconstructs the image using the image data associated with the contiguous FOVs and the image registration information. Alternately, the clinician and/or the controller can manually feed slides into the microscope imaging system.

With reference now to FIG. 2, there is shown a conventional microscope slide 200 formed of any suitable material, such as, for example, glass, for use within microscope imaging system 100. An identifier region 210 is located on the slide 200, such as at one end of microscope slide 200. A unique identifying tag is located in the identifier region 210. The identifying tag can be, for example, a barcode sticker, or any tag that can be used to identify the slide 200. The microscope slide 200 further includes a scan region 212, which is at least partially surrounded by a non-scan region 214. The scan region 212 represents a predetermined preliminary region of the slide 200 to be scanned.

At least one sample, such as a sample 216 is likely to be entirely or partially located within the scan region 216. The sample 216 is representative of any target specimen, such as, for example, a tissue sample resulting from a needle biopsy. The non-scan region 214 is the remaining area (excluding the scan region 216) along the edge of the microscope slide 200, within which it is unlikely that any sample is located. Consequently, the non-scan region 214 need not be scanned by the microscopic imaging system 100.

Figure 3:
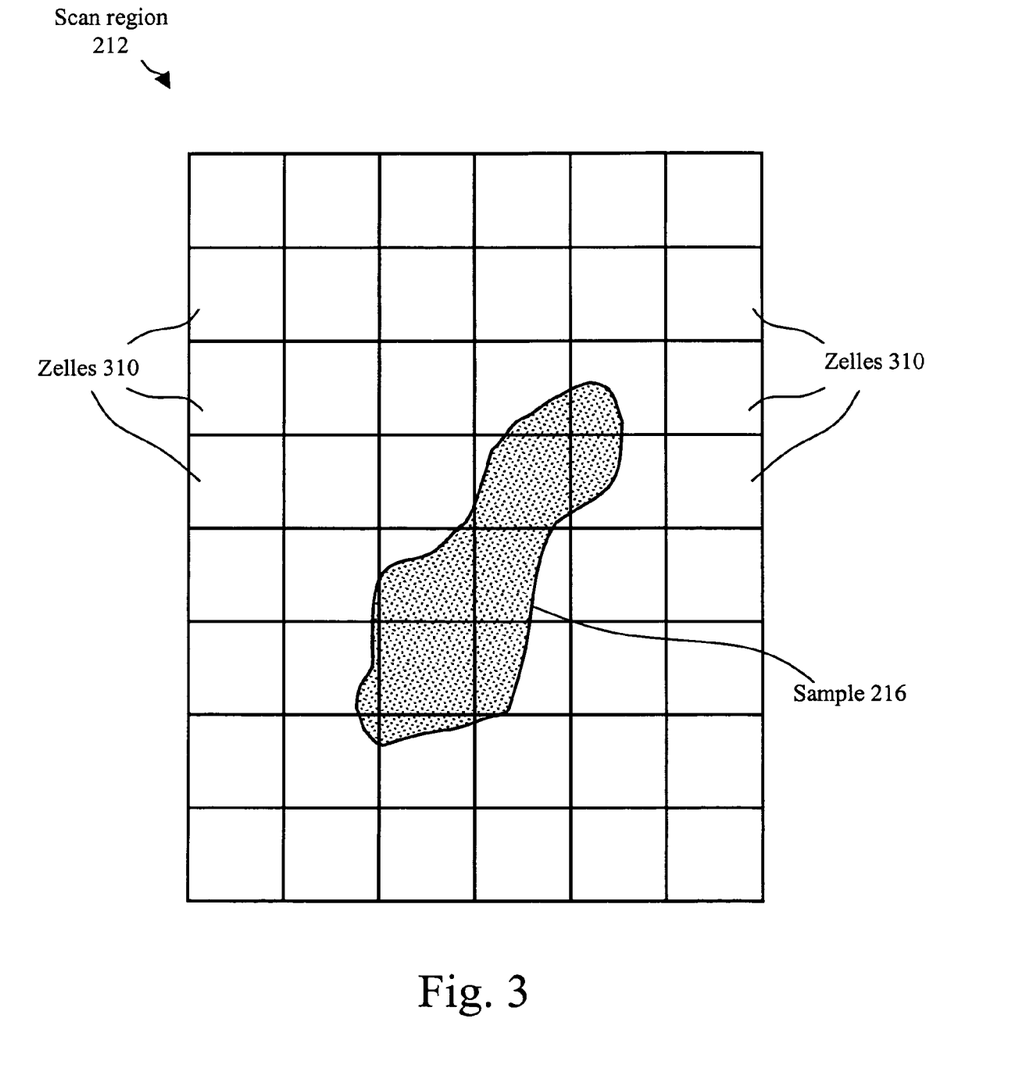
FIG. 3 illustrates an expanded view of a scan region of the microscope slide.

FIG. 3 illustrates an expanded view of the scan region 212 of the microscope slide 200 during the automated scanning operation of the microscope imaging system 100. The scan region 212 is partitioned into an array of contiguous segments, or zelles 310. Each zelle 310 covers a discrete portion of the scan region 212 and all the zelles collectively cover the entire area of the scan region 212. In an embodiment, the area of each zelle 310 is defined by the power (i.e., magnification) setting of the microscope 110. Those skilled in the art will appreciate that a microscopic FOV reduces very substantially as the magnification increases.

In an embodiment, the zelles 310 are representative of the FOVs during an image scanning operation in which low magnification and resolution are used; thus, the scan time and the amount of stored image data is minimized. Additionally, a low-power lens has a greater depth of focus, so microscope 110 can search for tissue without refocusing. The low-power lens is focused at either a best-guess plane or a plane derived from microscope calibration during the image scanning operation. Optionally, a separate low-resolution, wide-FOV camera may be used.

In an embodiment, the controller 112 executes image-processing and image analysis to determine any regions of microscope slide 200 having content worthwhile for re-examination at a higher magnification during later scanning phases. More specifically, the controller 112 classifies zelles containing specimen content in one category and classifies zelles containing no specimen content in a separate category. For example, any zelle 310 found to contain specimen content is classified as "interesting" and is mapped as a logical "1". By contrast, any zelle 310 found to have no specimen content is classified as "non-interesting" and is mapped as a logical "0." In this manner, a silhouette of each specimen, e.g., sample 216, is collectively formed by the zelles 310, thereby creating what is effectively a low-resolution image that may be processed using standard image-processing methods.

The parameters for analyzing each zelle 310 and determining whether there is anything of interest in each zelle 310 can be set by an operator depending on the test and application. In this way, the operator can vary how a zelle 310 will be classified. In order to efficiently perform the analysis of the zelles 310, it is desirable to avoid analyzing empty zelles 310 (i.e., zelles with no specimen content) so as to avoid unnecessarily using processing power and time of the controller 112. At the same time, there is a need to ensure that the controller does not miss any zelle 310 having mostly empty space and only a tiny segment of interest, but rather classifies such zelles as "interesting". For example, the lower, left edge (with respect to FIG. 3) of the sample 216 is partially located within a zelle and it is desirable that this zelle not be missed. Thus, a statistical analysis is run to determine whether there is anything of interest in each zelle 310 in order to reduce the likelihood of missing any zelles with sample located therein.

The manner in which a zelle is classified as "interesting" can be unique and varied to each particular application or test. For example, a priority may be set for blue stain, red stain, any speck of tissue, or a specified large volume of tissue in order for a zelle 310 to be classified as "interesting." Consequently, the biological requirements of each particular test, as set by an operator, determine what is of interest and determine the parameters for classifying a zelle as "interesting." Therefore, each zelle 310 is analyzed using predetermined parameters for a particular test using associated processes that determine whether contents of each zelle 310 match the predetermined criteria. If the contents of a particular zelle meet the predetermined criteria, then that zelle is classified as "interesting."

Figure 4:
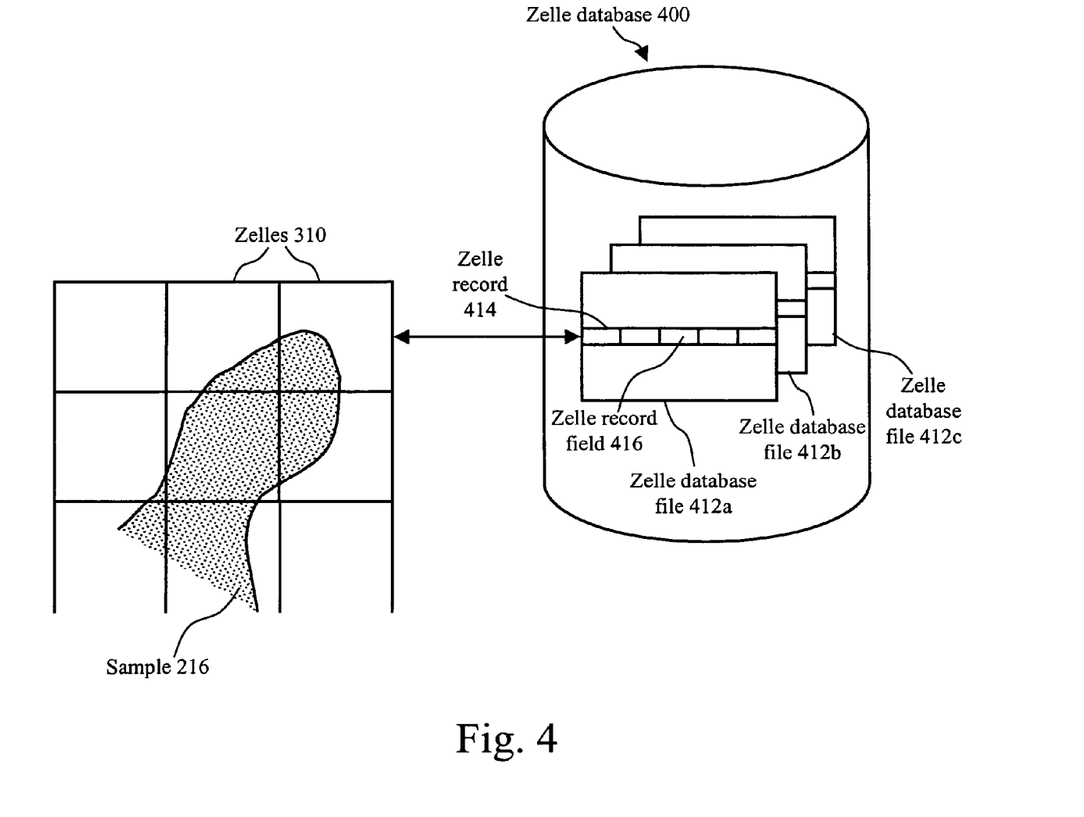
FIG. 4 illustrates a relationship between each zelle of an image and a zelle database that includes a plurality of database files, each containing a plurality of zelle records.

With reference to FIG. 4, the zelles 310 derived from a particular sample can be stored in a database. FIG. 4 illustrates the relationship between each zelle 310 derived from, for example, the sample 216 and a zelle database 400. In an embodiment, the zelle database 400 is a non-volatile computer memory that resides on a physical hard drive of the controller 112 of microscope imaging system 100. The zelle database 400 contains a plurality of zelle database files 412 (e.g., zelle database files 412a, 412b, and 412c in FIG. 4), wherein each zelle database file 412 contains one or more zelle records 414. Each zelle record 414 further includes a plurality of record fields 416 composed of binary digital data.

In an embodiment, each zelle record 414 contains multiple zelle record fields 416 that each describe one or more individual attributes of its respective associated zelles 310. The attributes can vary and can include, for example, an identification number of scanned microscope slide 200, real-world x, y coordinates for the zelle, scale factors, the area of zelle 310, the time and date of the scan operation, the identification number of microscope imaging system 100, an image file address where the image data record for zelle 310 is stored, and a pointer to the image data record within the image file. Other information may also be contained in the database. For example, varied patient and health care provider information can also be stored, including, but not limited to, the patient's name, age, and address, and the physician's name and location of practice.

The zelle database 400 also includes placeholders for the width and height coordinates of each zelle 310. The width and height coordinates can be with respect to a coordinate system, such as a Cartesian coordinate system comprised of x and y coordinates that are oriented relative to a reference point on the slide. The process of capturing and inserting these coordinates into the zelle database 400 is referred to as the "registration" process. The registration process of these coordinates can occur either during the image capture process (referred to as "online") or after the image capture process is complete (referred to as "offline"). Such a process is described in co-pending U.S. patent application entitled "Method Of Registering Field Of View", which is assigned to the same assignee as the instant application, and which is incorporated herein by reference in its entirety.

Figure 5:
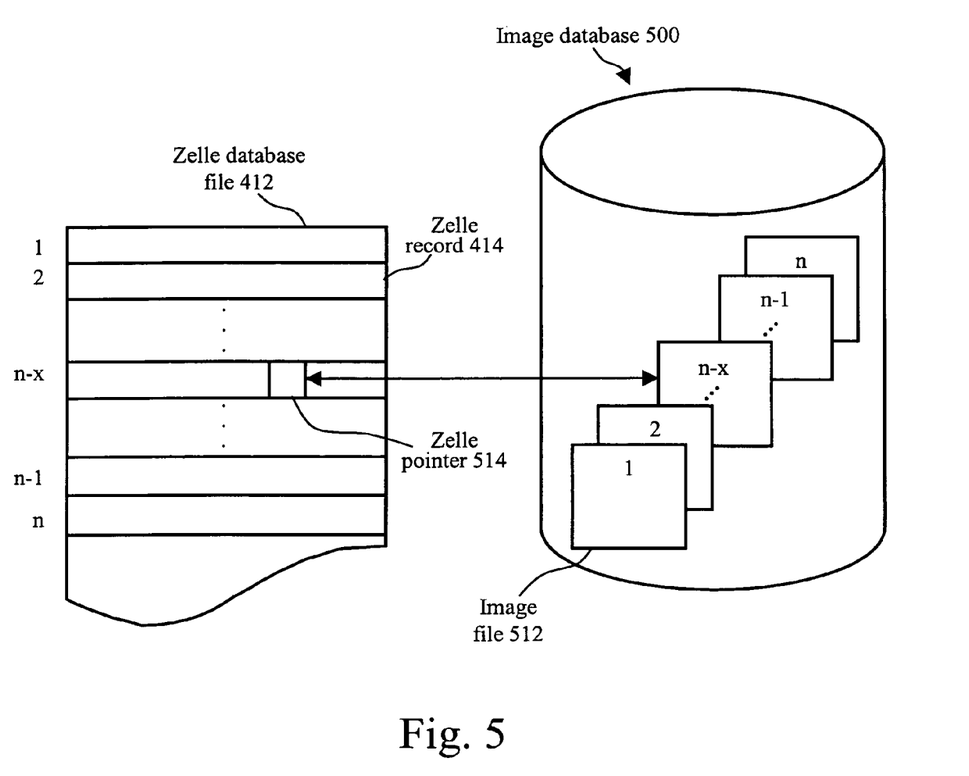
FIG. 5 illustrates the relationship between each zelle record of the zelle database and the contents of a separate image database.

With reference to FIG. 5, an image database can be maintained for storing digital scanned image data for the entire scanned region 212 of the slide 200. FIG. 5 illustrates the relationship between each zelle record 414 of zelle database 400 and the contents of the image database 500. In an embodiment, the image database 500 is a non-volatile computer memory that resides on a physical hard drive of the controller 112 of the microscope imaging system 100. The image database 500 includes a plurality of image files 512 that collectively contain all the digital scanned image data for the entire scan region 212 of the microscope slide 200. The zelle database 400 and the image database 500 are depicted as separate entities for illustration purposes in FIGS. 4 and 5, respectively. However, they may be a single database.

With reference still to FIG. 5, the image database 500 includes at least one image file 512. Each image file 512 within the image database 500 contains the digitized image data for one or many corresponding zelles 310. Each zelle database file 412 has a zelle pointer 514 that resides in a record field 416 within a corresponding zelle record 414. The zelle pointer 514 can be any type of means, well known to those skilled in the art, of establishing a unique association between a data record in one database file and information contained in another data record contained in a separate data file. In the current application, the zelle pointer 514 identifies a single image file 512 that possesses the unique image data of a given zelle 310, which is referenced by a single zelle record 414.

Figure 6:
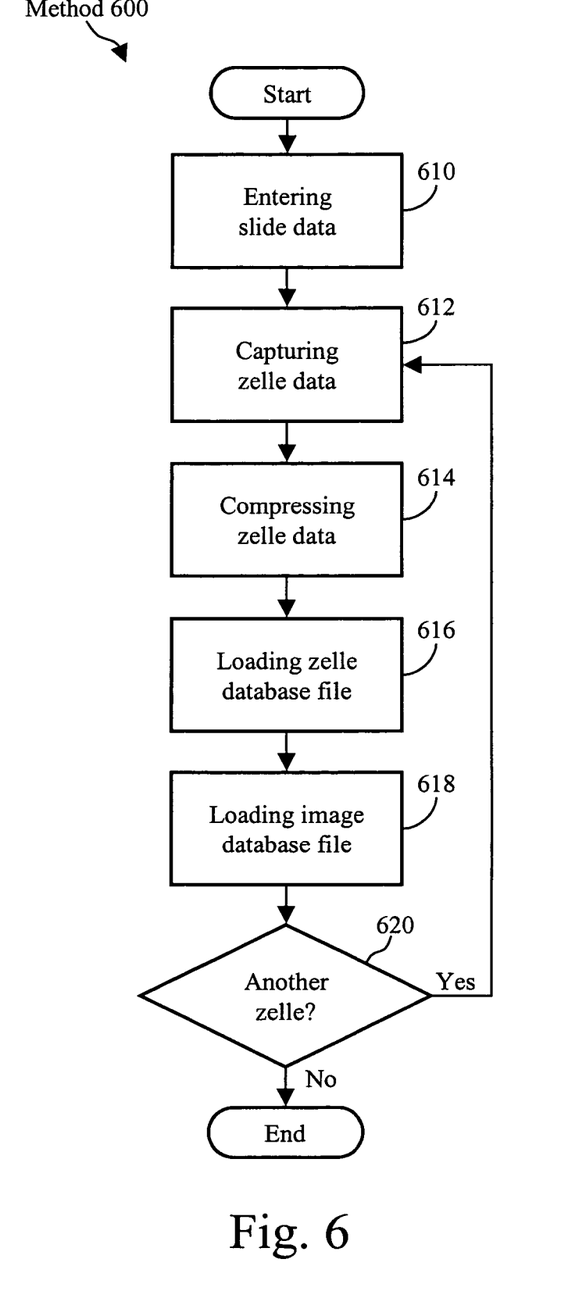
FIG. 6 illustrates a flow diagram of a method for storing an image.

FIG. 6 illustrates a flow diagram of a method 600 of an image storage process. The disclosed method 600 can be used, for example, with images obtained using the microscope imaging system 100. It should be appreciated that the method 600 can also be used for storing other types of images aside from microscopic images. Pursuant to an initial operation, represented by flow diagram box 610 in FIG. 6, attribute data regarding a microscopic slide is obtained. The data relates to a particular microscopic slide for which an image is obtained. The slide data may be obtained, for example, by the barcode reader 116 scanning a barcode information on the slide 200 in order to obtain identification data regarding the slide. Other means of identifying and recording the slide information can be used. The identification of the slide 200 facilitates later saving of the image data in relation to the appropriate microscope slide 200.

In the next operation, represented by the flow diagram box 612, zelle attribute data is captured for the microscopic slide 200. As discussed above, the slide 200 can be divided into a series or group of zelles 310 (also referred to as regions or segments). The zelles can be classified as "interesting" or "noninteresting" using pre-determined classification criteria. Using the zelles, the microscope imaging system 100 lays out a series of locations on the microscope slide 200 where high-resolution images are taken. As a result, with specific knowledge of interesting regions and of diagnostically important items, a high-magnification lens in combination with the camera 118 are used to capture a digital image of all "interesting" zelles 310.

As discussed above, the zelle attribute data can include various types of data, including, for example, an identification number of scanned microscope slide 200, real-world x, y coordinates for the zelle, scale factors, the area of zelle 310, the time and date of the scan operation, the identification number of microscope imaging system 100, an image file address where the image data record for zelle 310 is stored, and a pointer to the image data record within the image file. After the slide data is entered (such as by the barcode reader), the data is transmitted to the controller 112. The resulting image data is then transmitted to the controller 112.

The next operation of the method 600 is represented by the flow diagram box 614 in FIG. 6. In this operation, the previously-obtained zelle image data is compressed using one or more compression algorithms. In an embodiment, the compression algorithms apply to pixel-level compression on high-resolution images. As mentioned, it can be desirable to save only "interesting" regions such that only the "interesting" regions are compressed. However, all of the regions can be compressed if desired.

Each zelle corresponds to an FOV of the microscopic imaging system. In an embodiment, the zelle corresponding to each FOV is compressed in two ways corresponding to two passes: in a first pass, the image data for a zelle is compressed by restoring color variations existing in any white space to be uniformly white; and in a second pass, the image data is compressed using a modified Classic Huffman Shift compression algorithm. The compression algorithms are more efficient in this application because the characteristics of the sample 216 and the scan region 212 are known and easily discernable from the non-scan region 214. Parameters that govern and describe the characteristics of the sample 216 and the scan region 212 are set accordingly.

For example, the compression algorithm takes advantage of the anticipated distribution of the colors in the image. This knowledge allows the compression to be modified for efficiency in this application. Filters can define what colors are of value, in order to improve the efficiency of the process. For example, this allows the non-valuable colors to be set to the same value, while maintaining the picture as plausible when restored. Whatever color variations exist in the white space, for example, are non-informational; thus, restoring this space as uniformly white is acceptable. Upon completion of the compression algorithms, the image data is stored within the controller 112, such as within non-volatile computer memory that resides on a physical hard drive of the controller 112.

With reference still to FIG. 6, the method 600 next proceeds to the operation of flow diagram box 616. In this operation, the controller loads or writes the zelle database file 412 associated with the current microscope slide. As discussed above with reference to FIG. 4, each zelle has a corresponding zelle database file 412 that contains individual attributes of a corresponding zelle 310. The attribute data for the current zelle was previously obtained pursuant to the operation of flow diagram box 610, as described above. The controller 112 automatically writes the data into multiple record fields 416 (FIG. 4) of zelle records 414 contained in zelle database files 412.

In the next operation, represented by flow diagram box 618, the image database file is loaded or written by the controller 112. In this operation, the compressed zelle digital image data that was obtained in the operation 614 and that depicts the individual appearance of zelles 310 is automatically written into image records contained in the image files 512, as shown in FIG. 5. The method 600 then proceeds to the operation represented by flow diagram decision box 620, where it is determined whether there is another zelle for recording. If there is another zelle for recording (a "yes" output from decision box 620), the method 600 returns to the operation of flow diagram box 612 and the process repeats for the next zelle. If there are no more zelles for recording (a "no" output from decision box 620), then the method 600 ends.

Figure 7:
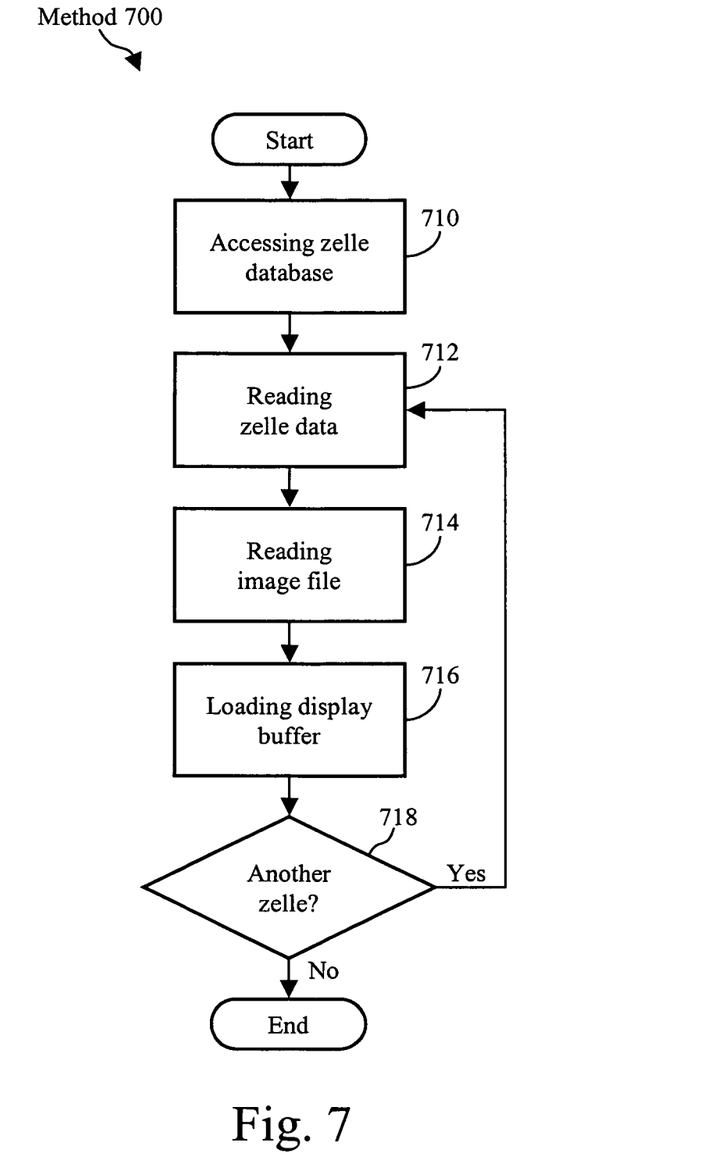
FIG. 7 illustrates a flow diagram of a method for retrieving an image.

With reference now to FIG. 7, there is illustrated a flow diagram of a method 700 of an image retrieval process. The method is suitable for use with, but not limited to, the microscope imaging system 100. In a first operation, represented by the flow diagram box 710, the controller 112 accesses the zelle database 400 (shown in FIG. 4) that was created pursuant to the method 600 described above with reference to FIG. 6. In the operation 710, using a control software loaded in memory of the controller 112, a clinician recalls the image data for a selected microscope slide 200. The controller 112 then automatically opens the zelle database 400 and image database 500.

In the next operation, represented by the flow diagram box 712, the controller 112 reads a zelle record 414 from the zelle database 400 for an initial zelle. As discussed above, the zelle record contains attribute data for a corresponding zelle, including for example, an identification number of scanned microscope slide 200, real-world x, y coordinates for the zelle, scale factors, the area of zelle 310, the time and date of the scan operation, the identification number of microscope imaging system 100, an image file address where the image data record for zelle 310 is stored, and a pointer to the image data record within the image file. The control software loaded in the controller 112 systematically steps through all the zelle records 414 contained in zelle database files 412 and parses the zelle pointer 514. As discussed above with reference to FIG. 5, the zelle pointer 514 is a unique identifier that locates the image data record (in an image file 512 that contains the digital image information for the selected zelle 310.

The method 700 next proceeds to the operation represented by flow diagram box 714, where the controller 112 reads the content of the image data record contained in the image file 512 for the current zelle 310. The method 700 then proceeds to the operation represented by flow diagram box 716, where the controller uses the real-world x and y coordinates for each zelle 310 (which were obtained in operation 712), to write the digital image information for a selected zelle 310 into the correct location in a display buffer of display device 114. In this manner, the current zelle 310 is accurately positioned in the context of the overall display.

The method then proceeds to the operation of flow diagram decision box 718, where it is determined whether another zelle is to be displayed. If so, (a "yes" output from decision box 718), then method 700 returns to the operation of flow diagram box 712 and the process repeats for a next zelle. If no other zelles are to be displayed (a "no" output from decision box 718), then the method 700 ends.

A number of embodiments have been described. Nevertheless, it will be understood that various modifications may be made without departing from the spirit and scope of the invention. Accordingly, other embodiments are within the scope of the following claims.

What is claimed is:

1. A method of storing a digital image acquired by a computer-controlled digitizing microscope, comprising:
    partitioning a microscopic image into a matrix of zelles, wherein each zelle comprises a discrete portion of the microscopic image and each zelle includes a plurality of pixels of the microscopic image;
    for each zelle, capturing attribute data descriptive of an associated zelle and capturing image data descriptive of a discrete portion of the microscopic image contained in the associated zelle;
    for each zelle, determining whether said zelle contains specimen content therein;
    classifying each zelle either partially or fully including specimen content therein as having information of interest and classifying each zelle not including any specimen content therein as not having information of interest;
    compressing the image data;
    storing the attribute data in a zelle database comprised of at least one zelle database file, each zelle database file being associated with at least one corresponding zelle; and
    storing the compressed image data in an image database comprised of at least one image file, wherein each image file is associated with a corresponding zelle database file.

2. A method as defined in claim 1, wherein said compressing comprises a first process including restoring variations in color values for non-valuable colors to be uniform and a second process including a modified Classic Huffman Shift compression algorithm.

3. A method as defined in claim 2, wherein said non-valuable color comprises white.

4. A method as defined in claim 1, wherein the zelle database file contains one or more zelle records and wherein each zelle record further includes a plurality of record fields comprising binary digital data.

5. A method as defined in claim 4, wherein each zelle record field relates to one or more individual attributes of its at least one corresponding zelle.

6. A method as defined in claim 4, wherein each zelle record has a zelle pointer that identifies a single image file that possesses unique image data of the zelle associated with that zelle record.

7. A method as defined in claim 1, wherein the attribute data includes at least one of the group consisting of an identification number of a scanned microscope slide, coordinates for the associated zelle, a scale factor, area of the associated zelle, and an image file address where the image data for the associated zelle is stored.

8. A method as defined in claim 1, wherein the zelle database and the image database comprise non-volatile computer memory residing on a physical hard drive.

9. A method as defined in claim 1, wherein the zelle database and the image database comprise a single database.

10. A method as defined in claim 1, further comprising: accessing at least one zelle database file for the microscopic image to obtain attribute data relating to a selected zelle; accessing at least one image file associated with the zelle record to obtain image data associated with the selected zelle.

11. A method as defined in claim 1, wherein only zelles containing information of interest are compressed.

12. A non-transitory computer readable medium encoded with a computer program comprising instructions to cause a computer to:
    partition a microscopic image into a matrix of zelles, wherein each zelle comprises a discrete portion of the microscopic image and wherein each zelle includes a plurality of pixels of the microscopic image;
    for each zelle, capture attribute data descriptive of an associated zelle and capture image data descriptive of a discrete portion of the microscopic image contained in the associated zelle;
    for each zelle, determine whether said zelle contains specimen content therein; classifying each zelle either partially or fully including specimen content therein as having information of interest and classifying each zelle not including any specimen content therein as not having information of interest;
    compress the image data for each zelle;
    store the attribute data in a zelle database comprised of at least one zelle database file, each zelle database file being associated with at least one corresponding zelle; and store the compressed image data in an image database comprised of at least one image file, wherein each image file is associated with a corresponding zelle database file.

13. A non-transitory computer readable medium as defined in claim 12, wherein the image data is compressed pursuant to two processes, including a first process including restoring variations in color values for non-valuable colors to be uniform and a second process including a modified Classic Huffman Shift compression algorithm.

14. A non-transitory computer readable medium as defined in claim 12, wherein the zelle database file contains one or more zelle records and wherein each zelle record further includes a plurality of, record fields comprising binary digital data.

15. A non-transitory computer readable medium as defined in claim 14, wherein each zelle record field relates to one or more individual attributes of its at least one corresponding zelle.

16. A non-transitory computer readable medium as defined in claim 14, wherein each zelle record has a zelle pointer that identifies a single image file that possesses unique image data of the zelle associated with that zelle record.

17. A non-transitory computer readable medium as defined in claim 12, wherein the attribute data includes at least one of the group consisting of an identification number of a scanned microscope slide, coordinates for the associated zelle, a scale factor, area of the associated zelle, and an image file address where the image data for the associated zelle is stored.

18. A non-transitory computer readable medium as defined in claim 12, wherein the instructions further cause the computer to:
   access at least one zelle database file for the microscopic image to obtain attribute data relating to a selected zelle; and
   access at least one image file associated with the zelle record to obtain image data associated with the selected zelle.

19. A microscope imaging system comprising:
   a computer comprising: a processor; a computer program on computer readable medium, the computer program comprising instructions to cause the computer to:
   partition a microscopic image into a grid of zelles, wherein each zelle comprises a discrete portion of the microscopic image and wherein each zelle includes a plurality of pixels of the microscopic image;
   for each zelle, capture attribute data descriptive of an associated zelle and capture image data descriptive of a discrete portion of the microscopic image contained in the associated zelle;
   for each zelle, determine whether said zelle contains specimen content therein;
   classify each zelle either partially or fully including specimen content therein as having information of interest and classify each zelle not including any specimen content therein as not having information of interest;
   compress the image data for each zelle;
   store the attribute data in a zelle database comprised of at least one zelle database file, each zelle database file being associated with at least one corresponding zelle; and
   store the compressed image data in an image database comprised of at least one image file, wherein each image file is associated with a corresponding zelle database file.

20. A system as defined in claim 19, wherein the image data is compressed pursuant to two processes, including a first process including restoring variations in color values for non-valuable colors to be uniform and a second process including a modified Classic Huffman Shift compression algorithm.

21. A system as defined in claim 19, wherein the zelle database file contains one or more zelle records and wherein each zelle record further includes a plurality of record fields comprising binary digital data.

22. A system as defined in claim 21, wherein each zelle record field relates to one or more individual attributes of its at least one corresponding zelle.

23. A system as defined in claim 21, wherein each zelle record has a zelle pointer that identifies a single image file that possesses unique image data of the zelle associated with that zelle record.

24. A system as defined in claim 19, wherein the attribute data includes at least one of the group consisting of an identification number of a scanned microscope slide, coordinates for the associated zelle, a scale factor, area of the associated zelle, and an image file address where the image data for the associated zelle is stored.

25. A system as defined in claim 19, wherein the instructions further cause the computer to:
   access at least one zelle database file for the microscopic image to obtain attribute data relating to a selected zelle; and
   access at least one image file associated with the zelle record to obtain image data associated with the selected zelle.

* * * * *